United States Patent [19]
Habermehl et al.

[11] Patent Number: 5,542,323
[45] Date of Patent: Aug. 6, 1996

[54] SCREW STRIP WITH OVERLAPPING WASHERS, AND METHOD AND APPARATUS FOR INSTALLATION

[75] Inventors: G. Lyle Habermehl, 7528 Hickory Hill Ct., Whites Creek, Tenn. 37189; Paul T. Scherer, Lexington, Ky.

[73] Assignee: G. Lyle Habermehl, Whites Creek, Tenn.

[21] Appl. No.: 234,333

[22] Filed: Apr. 28, 1994

[51] Int. Cl.$^6$ .......................... B25B 23/04; B65D 85/24
[52] U.S. Cl. .................. 81/434; 81/435; 206/347
[58] Field of Search ...................... 81/434, 57.37, 81/433, 435; 206/338, 343, 345, 347; 29/813; 227/136

[56] References Cited

U.S. PATENT DOCUMENTS

| | | | |
|---|---|---|---|
| 3,212,632 | 10/1965 | Baum et al. | 206/347 X |
| 4,106,619 | 8/1978 | Haytayan | 206/346 |
| 4,121,715 | 10/1978 | Hodil, Jr. | 206/347 |
| 4,146,071 | 3/1979 | Mueller | 144/32 |
| 4,167,229 | 9/1979 | Keusch et al. | 206/343 |
| 4,930,630 | 6/1990 | Habermehl | 206/347 |

FOREIGN PATENT DOCUMENTS

| | | |
|---|---|---|
| 382697 | 3/1987 | Austria . |
| 248101 | 12/1987 | European Pat. Off. . |
| 479382 | 4/1992 | European Pat. Off. . |
| 2364742 | 4/1978 | France . |

Primary Examiner—D. S. Meislin
Attorney, Agent, or Firm—Dorsey & Whitney L.L.P.

[57] ABSTRACT

A screw strip is disclosed in which each screw carries a washer on its screw shank between the tip of the screw and a plastic strip carrying a plurality of screws. A screw driving apparatus, and method of use of the strip are also disclosed. The washers and screw heads are of relatively large diameter and adjacent washers overlap each other. The power tools used to install the screws include indexing means which advance successive screws into driving position, and retract the remaining screw strip rearwardly in order to avoid interference between the driving tool, the driven screw and adjacent washers. This configuration permits application of large head screws such as hexagonal head screws carrying large washers by power tool socket drivers and is particularly useful in sheet metal applications. The invention is applicable to any fastener with a threaded shank including bolts and screws.

18 Claims, 9 Drawing Sheets

SCREW STRIP WITH OVERLAPPING WASHERS, AND METHOD AND APPARATUS FOR INSTALLATION

This invention relates to a unitary holding strip made preferably of plastic material, for retaining a plurality of threaded fasteners, such as screws and bolts, in a row particularly adapted to hold fasteners and relatively large size washers. A method and apparatus for use of such a strip are also provided.

BACKGROUND OF THE INVENTION

In the present disclosure and drawings, the invention and prior art will be described in relation to screws, however it will be understood that any threaded fastener may be used to equal advantage, such as a bolt, or conventional fasteners with a composite shank design having a drill bit tip, thread tapping intermediate shank, and threaded upper shank.

Many screw strips are known whereby the threaded fasteners are connected to each other by a retaining belt, preferably of plastic material, although any frangible material can be used. The strips are engaged by a power-driven screw bit and then screwed into a workpiece. In the course of the bit engaging the screw and driving the screw into the workpiece, the screw breaks away and becomes detached from the plastic strip.

Conventional screw strips and machinery to utilize such strips are described in the prior art U.S. Pat. Nos. 4,167,229 to Keusch et al and 4,146,071 to Meuller et al, the disclosures of which are incorporated by reference herein.

In certain fastening applications there is a need to apply fasteners which include washers. For example, metal cladding panels are attached to the roofs or walls of buildings with self tapping screw fasteners that include a metal washer having a neoprene underside layer to effectively seal the hole made for the fastener in the cladding panel.

One such screw strip which includes washers is disclosed in the applicant's U.S. Pat. No. 4,930,630 to Habermehl issued Jun. 9, 1990. The disclosure in that patent is specifically incorporated by reference herein.

In many applications relatively large sized washers or screw heads are required. Conventional prior art screw strips, if adapted for use with washers, require the spacing between screw fasteners to be extended in order to provide sufficient clearance for such large size washers and screw heads. This type of modification is generally unacceptable since the mechanisms used to index the screw strips in an incremental fashion have a standard maximum fixed incremental distance at which they operate. The indexing mechanisms are typically limited in that the spacing between screw fasteners is not capable of alteration.

It is desirable to maintain the spacing between fasteners at a constant dimension regardless of the size of the washers or the screw heads.

In certain applications a hexagonal head or other externally driven screw head types are desired. Prior art screw strips and devices for driving the screws are of limited application since hexagonal screw heads require a socket driver which envelops the entire screw head. The socket driver itself is of large outer diameter such that the socket driver interferes with the heads or washers of rearwardly adjacent screws in the strip. Damage may result to the socket driver or screw. In order to avoid interference, the spacing between screws on conventional strips must be extended.

The use of socket drivers for hexagonal screw heads and relatively large sized washers virtually eliminates the possibility of using prior screw strips or driving devices. In order to accommodate the large diameter washers and socket drivers, the prior art devices would require that the spacing between connectors be increased. It is highly desirable that the spacing between connectors be standardized at a uniform dimension, such that the relatively expensive indexing mechanisms can be used in association with the wide variety of screw types and sizes.

The use of relatively large sized washers and socket drivers would result in interference between washers and socket drivers unless the spacing between fasteners was increased in prior art devices. Varying the spacing of screws in a strip would require modification or adjustment of the driving mechanism adding to the costs and labour involved.

Therefore it is desirable to have a screw strip and indexing device which accommodates relatively large sized washers and screw heads while maintaining the uniformity of fastener spacing on the strip.

It is also desirable to produce screw strips with washers in as compact a strip as possible to minimize cost of the strip and reduce size for handling.

SUMMARY OF THE INVENTION

The invention overcomes the disadvantages of the prior art in a novel manner in the provision of a frangible, preferably plastic, holding strip for holding a plurality of threaded fasteners, such as screws for example, each carrying a relatively large sized washer in a row. The strip comprises uniformly spaced parallel sleeves interconnected by lands with one of the screws received in each sleeve. Each screw has a head at an upper end, a tip at a lower end and a threaded shank extending from below the head to the tip. Each screw is received in each sleeve with the screw's head extending from an upper end of the sleeve and the screw's tip extending from a lower other end of the sleeve. A washer is engaged about the shank of each screw between the sleeve receiving that screw and the screw's tip. The diameter of each washer is greater than the distance between axial centers of the sleeve, and therefore, with the exception of the forwardmost washer of the strip, each washer overlaps with a forwardly adjacent washer. The sleeve threadably engages the threaded shank, preferably with the sleeve having a reduced strength portion between the lands, such that a screw on being threaded tip first into a workpiece is automatically separated from its sleeve carrying the washer while preferably simultaneously maintaining the length of the strip substantially intact and while guiding the screw by threaded engagement of the screw in its respective sleeve.

The strip of the invention is particularly adapted to carry screws for piercing sheet metal and to accommodate rubber-backed sealing washers for such screws. In certain applications, the use of relatively large sized washers is desirable. The overlapping of washers in the present strip enables the spacing of screws to be maintained at a standard uniform distance. Overlapping of washers, use of relatively large size screw heads, such as hexagonal heads, and use of socket drivers increases the risk that interference with the rearwardly adjacent screw retained on the strip will occur.

The difficulty of interference between screw heads and washers is not particularly prevalent when Robertson or Philips type screw heads are used. However, especially for outdoor applications, heads with Robertson or Philip driving sockets are prone to corrosion since moisture often collects within the driving socket. As a result, for external cladding fasteners, a hexagonal head with plastic or other weather resistant coatings is generally preferred.

Simply stated therefore, the method of use of such a strip includes the step of rearwardly retracting the remaining strip to provide sufficient clearance while the forwardmost screw is being driven.

The method of driving threaded fasteners, such as screws, with washers which are collated together in such a strip, comprises the steps of: aligning the head of a forwardmost screw of the strip to engage a screw driving bit of said mechanism; engaging said bit and screw head; downwardly driving the screw such that the tip and lower portion of the shank are driven into the workpiece by rotating the bit, thereby separating the forwardmost screw from the strip; rearwardly retracting the strip, and remaining screws retained therein, a distance sufficient to enable the passage of the bit, forwardmost screw and washer thereon without engaging a rearwardly adjacent screw and washer thereon retained in said strip; driving the forwardmost screw and washer to a predetermined depth in the workpiece; disengaging and retracting the bit; and repeating the procedure to incrementally drive successive screws of the strip.

A screw driving apparatus is also provided by the invention to drive screws retained in such a plastic holding strip. The apparatus comprises a body having a lateral slot and an intersecting vertical bore, the slot adapted to slidingly receive said strip; an elongate driver shaft journalled and longitudinally slidably housed in said bore, said shaft including screw driving bit means for engaging and driving said forwardmost screw in succession into said workpiece; indexing means for incrementally forwardly advancing and aligning the screws of said strip in succession coaxially with said bore; and retracting means for retracting the strip and screws retained thereon during the driving of the forwardmost screw after disengagement of the forwardmost screw from the strip.

Further aspects of the invention will become apparent upon review of the following detailed description.

BRIEF DESCRIPTION OF THE DRAWINGS

In order that the invention may be readily understood, a preferred embodiment of the invention will be described by way of example with reference to the accompanying drawings in which.

DETAILED DESCRIPTION OF THE PREFERRED EMBODIMENT

Plastic Holding Strip

Figure 1:
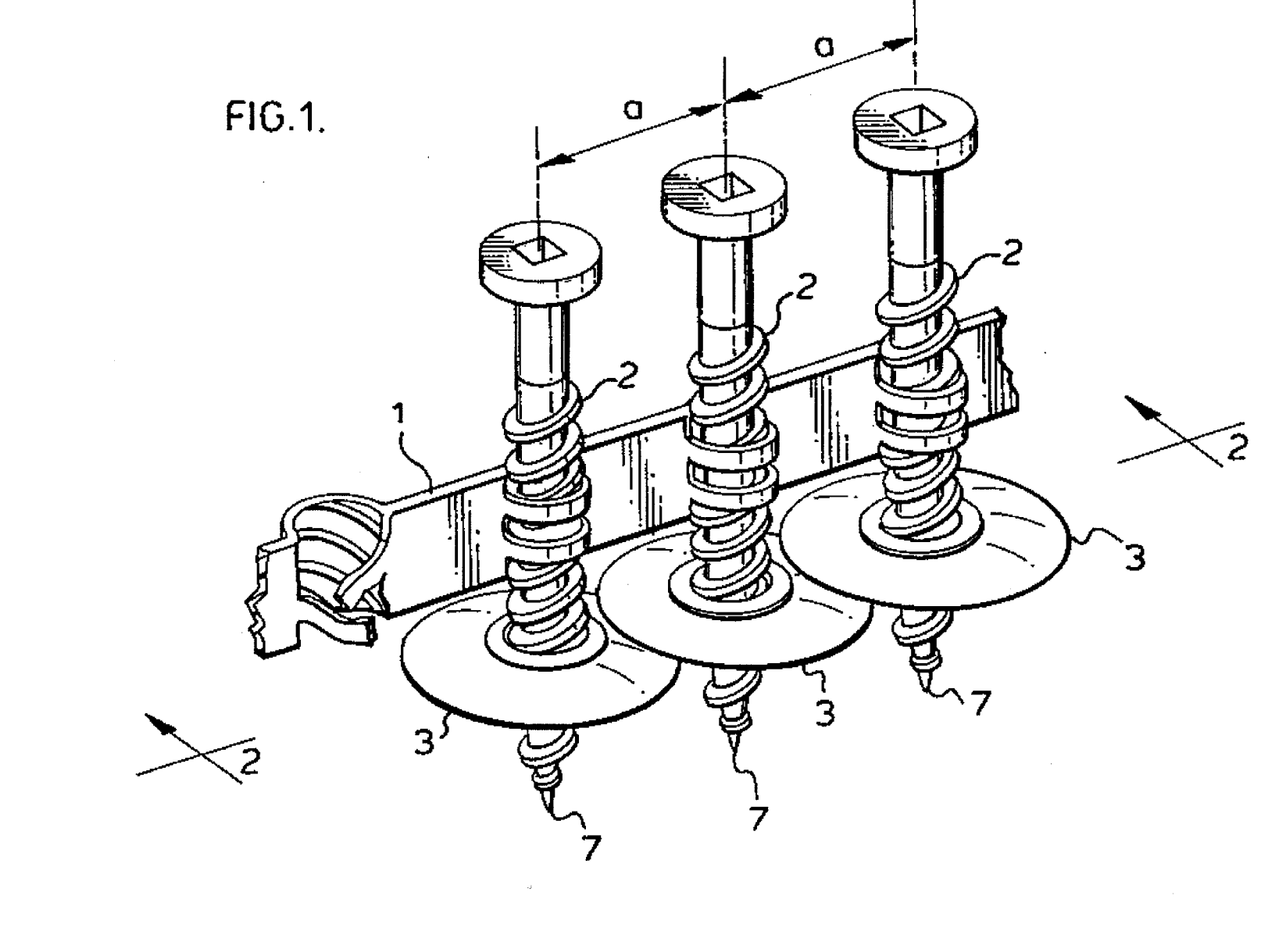
FIG. 1 is an upper perspective view of a Robertson head screw strip portion, showing at the left end of the strip a broken away sleeve where the forwardmost screw has been removed.
Figure 2:
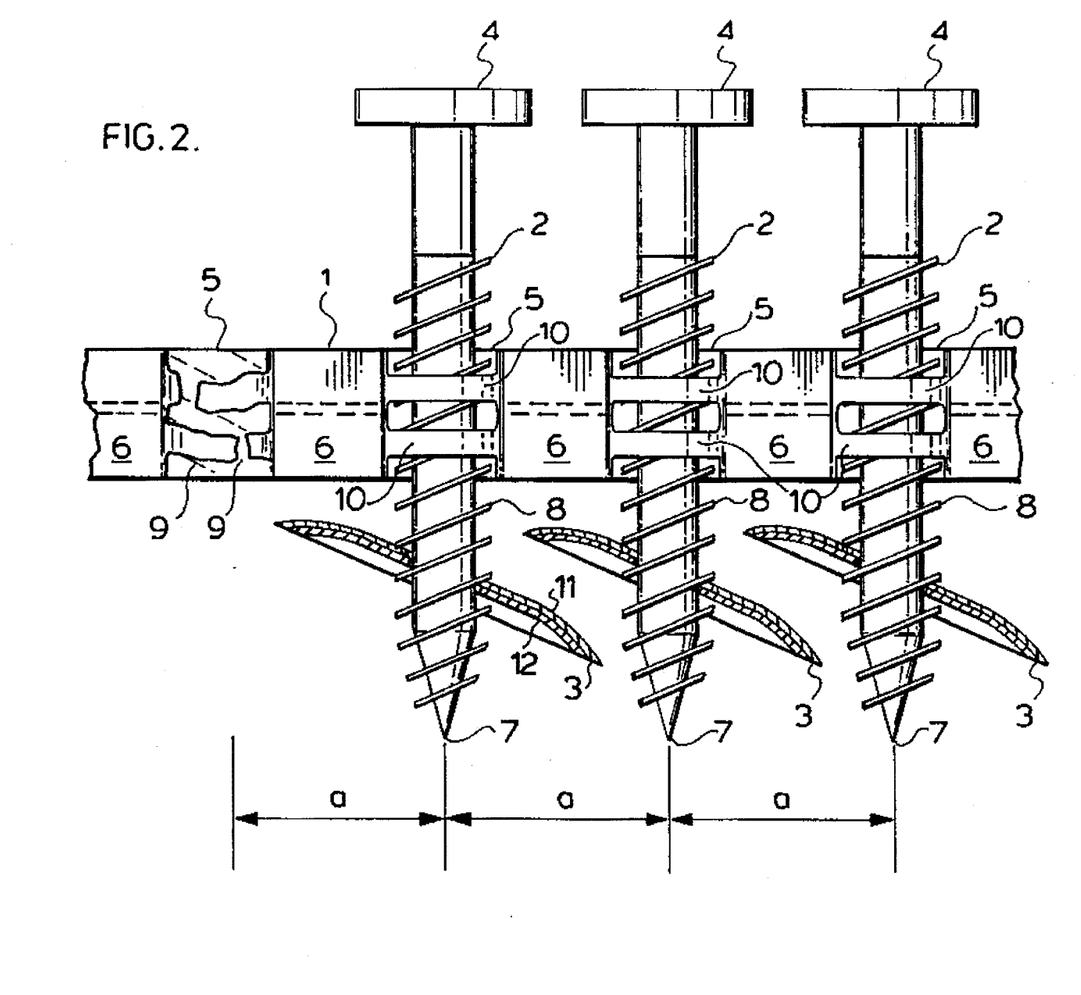
FIG. 2 is a partially sectional view of the strip along line 2—2 of FIG. 1.

FIGS. 1 and 2 illustrate the nature of the plastic holding strip 1 and configuration of screws 2 and washers 3 in accordance with the present invention. As drawn, the forward end of the strip 1 is at the left end of the drawing. The washers 3 are relatively large in comparison with the diameter of the screw shank 8. In order to maintain the close spacing of screws 2, the washers 3 overlap each other as illustrated in a compact series.

The screw strip includes a generally central plastic holding strip 1 for holding a plurality of screws 2. The screws 2 are held in the strip 1 in a row with the washers 3 engaged about the shank 8 of each of screw 2 between the strip 1 and the bottom tip 7 of the screw 2.

A particular advantage of the present invention is the arrangement of relatively large size washers 3 of the strip and the novel method and apparatus adapted to use such a strip. The diameter of each washer 3 is greater than the distance "a" between axial centres of the screws 2 held within the sleeves 5 of the strip 1. Therefore with the exception of the forwardmost washer 3 of the strip 1, each washer 3 overlaps with a forwardly adjacent washer 3.

It will be understood that the spacing between screws 2 (dimension "a") is preferably a standard dimension since machinery to manufacture the strips and the indexing mechanism for using the strips in screw driving operations can therefore be standardized.

As can be seen most clearly in FIG. 2, the overlapping of washers 3 can result in a crowding together of screws 2 at a standard and preferably minimal distance apart from one another "a". Due to the crowding together of screws 2, there is a possibility that the head 4 of the forwardmost screw (as drawn to the left in FIG. 2) will interfere with the washer 3 of the adjacent rearward screw 2 when driven axially downward into the workpiece.

As will be described in more detail below, the method of using the screw strips provides for the retraction of the strip a distance sufficient to enable the passage of the bit, forwardmost screw and washer without engaging the rearwardly adjacent screw and washer.

Apart from the specific configuration and arrangement of the washers 3, the plastic holding strip 1 and screws 2 are essentially as in the prior art such as disclosed in U.S. Pat. No. 4,930,630 to Habermehl the present inventor. Specifically, the plastic holding strip 1 includes spaced parallel sleeves 5 interconnected by lands 6 with one of the screws 2 received in each sleeve 5. The strip 1 has a forward end (as drawn in FIGS. 1 and 2 to the left) which is inserted into the screw driving apparatus and a rearward end (as drawn to the right) which preferably may be coiled into a cartridge which feeds the strip, in a manner similar to a coiled tape measure.

Each screw 2 has a head 4 at an upper end, a tip 7 at a lower end and a threaded shank 8 extending below the head 4 to the tip 7. Each screw 2 is received in each sleeve 5 with the screw head 4 extending from an upper end of the sleeve 5 and the screw tip 7 extending from a lower end of the sleeve 5. The sleeve 5 threadably engages the threaded shank 8 with molded plastic threads 9 as shown in the broken away sleeve to the left of FIG. 2.

The sleeve 5 has a reduced strength portion between the lands 6, which for example in the embodiment shown represent two relatively narrow plastic bands 10. The reduced strength bands 10 serve to retain the screws 2 in an aligned position in the strip 1 until the bands 10 are broken by the operation of driving the screw 2 into the workpiece.

When the forwardmost screw 2 is threaded tip first into the workpiece, the screw 2 is automatically separated from the sleeve 5 in a known manner. The screw 2 carries the washer 3 and is ultimately completely threaded into the workpiece. The strip remains substantially intact and guides the screw 2 by threaded engagement of the screw 2 in its respective sleeve 5 except for the rupturing of the narrow bands 10 when the forwardmost screw 2 is threaded into the workpiece.

The washers 3 as illustrated in the drawings comprise a metal outer dish 11 and an inner rubber sealing layer 12. Such washers 3 are conventionally used in attaching external sheet metal cladding to buildings. The washers 3 are frictionally engaged on a threaded shank 8 of the screw 2 due primarily to the flexibility of the rubber sealing layer 12. As is conventional however the use of simple metal disk shaped washers 11 may also be accomodated if the diameter of the aperture of the washer 3 is sized appropriately to frictionally engage the shank 8 of the screw 2. As illustrated, the washers 3 are each disposed at an acute angle to a longitudinal axis of the associated screw shank.

In order to avoid interference between the washer 3 and the plastic strip 1, the washer 3 is spaced from the sleeve 5 towards the tip 7 of each screw 2. In the embodiment shown, the bands 10 and rearward threaded portion 9 of the sleeve 5 completely surround the diameter of the screw shank 8. However it will be appreciated that a C-shaped sleeve 5 may also be used which only partially surrounds the screw 2 to form the reduced strength portion of the strip 1.

Apparatus and Method for Using strips

The mechanism of the embodiment illustrated is a modified version of that described in the prior art U.S. Pat. No. 4,146,071 to Meuller et al. The novel screw strip of the invention may be used in a screw driving assembly as shown in FIG. 3, which is substantially the same as those of the above prior art except for the particular means to retract the strip rearwardly and the indexing means for advancing the screws forwardly in succession.

A portable screw driver 13 is attached to a screw driving apparatus 14. A coil of screws 2 held in the plastic strip 1 is housed within a cartridge 15. The plastic strip 1 extends from the cartridge 15 into a lateral slot 16 in the body of the screw driving apparatus 14. An elongate driver shaft 17 is journalled and longitudinally slidably housed in a bore 18 which intersects with the lateral slot 16. The slot 16 is adapted to slidingly receive the strip 1 and has a forward abutment block 19 for aligning the forwardmost screw 2 coaxially with the bore 18.

The operation of using the screw driving assembly is the same as use of prior art devices with the notable exception that the present invention includes the step of retracting the screw strip 1 to provide a clear path for driving the forwardmost screw into the work piece.

Figure 3:
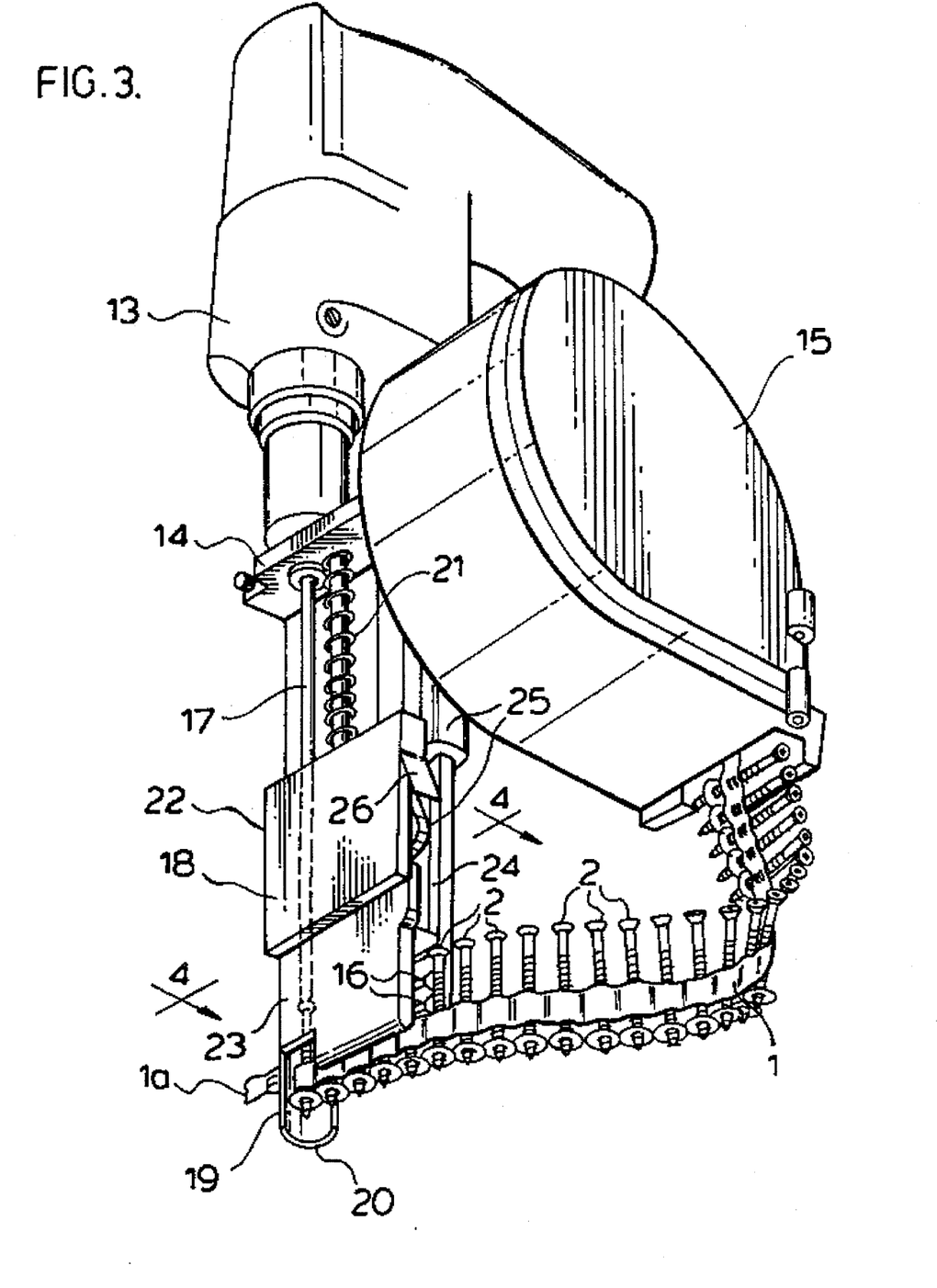
FIG. 3 is a perspective view of a complete screw driving assembly with: a portable electric screwdriver; screw strip coil housed in a cylindrical cartridge; and screw driving/strip feeding apparatus mounted to the forward end of the electric screwdriver.

FIGS. 4, 6, 8, 10 and 12 show sectional elevation views, along line 4—4 of FIG. 3, illustrating a step by step method of using the screw driving mechanism in accordance with the method of the present invention. FIGS. 5, 7, 9, and 11 show detail sectional views directed to the operation of the indexing and retracting lever arm mechanisms along lines 5—5, 7—7, 9—9, and 11—11 of FIGS. 4, 6, 8, and 10 respectively.

Figure 6:
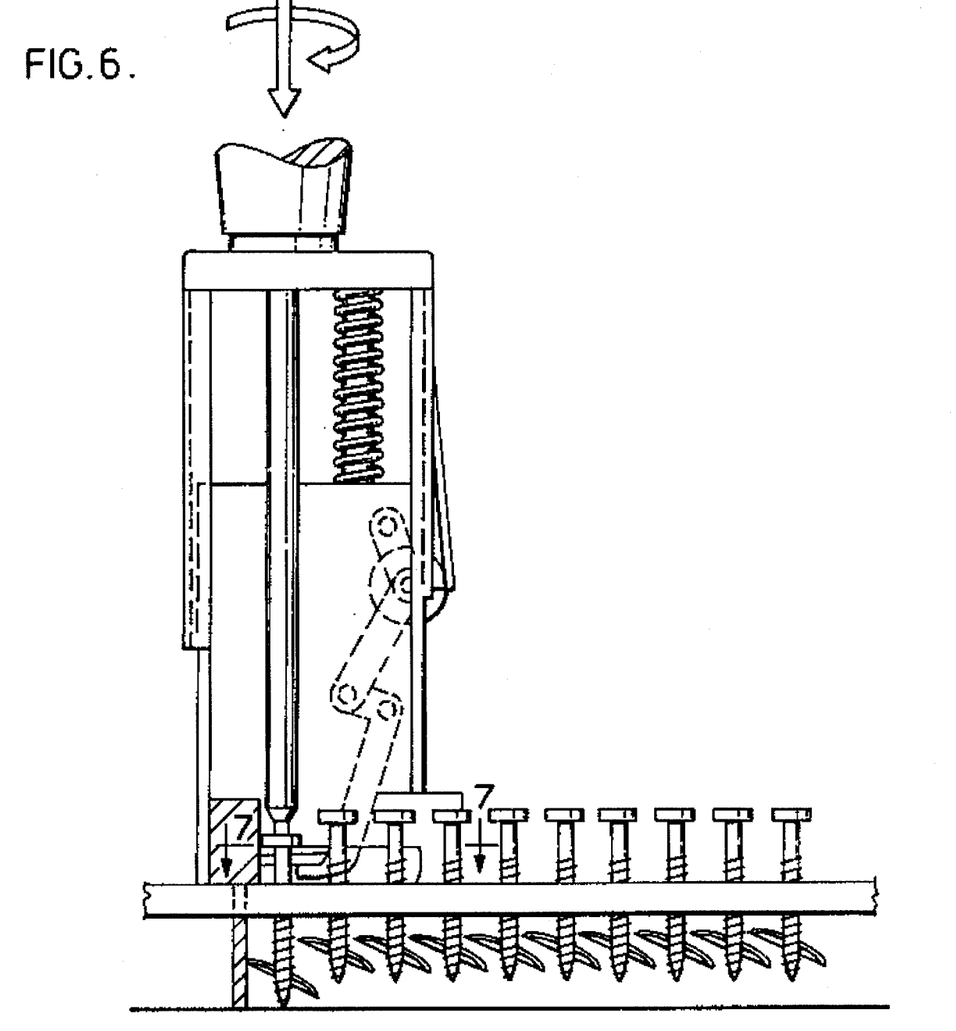
Figure 10:
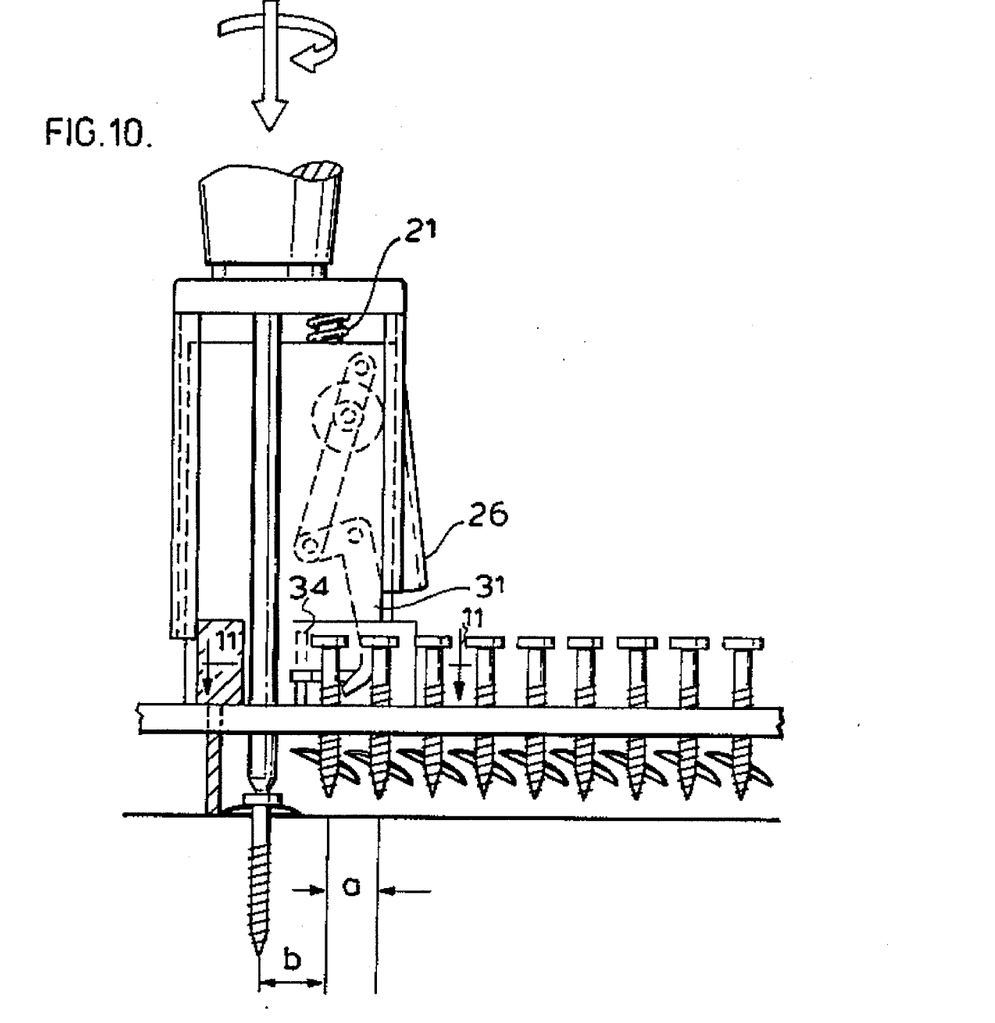

Briefly stated, the sequential operation of the apparatus is as follows. By exerting downward pressure on the drill, as indicated by the arrow in FIG. 4, the body 22 slides downwardly on the slide portion 23 and the spring loaded actuating wheel 25 comes into engagement with the ramp 26 as shown in FIG. 6. The actuating wheel 25 is biased to move to the right as drawn by a coil spring (not shown) about the stationary linkage pin 30. The pin 30 is fixed to the slide portion 23. Continued manual pressure slides the body 22 downward relative the slide portion 23 with the ramp 26 moving to the position shown in FIG. 8, thereby moving the actuating wheel 25 to the left as drawn, due to the taper of the ramp 26. The accompanying movement of the linkage connected to the actuating wheel 25 results in the retraction of the lower arm 31 which rotates counterclockwise about pin 30 and the retraction of the strip 1 in the direction of the arrow of FIG. 8. The maximum retraction of the strip 1 is shown in FIG. 10 as the screw 2 is being fully driven into the workpiece. When downward pressure on the drill is released, the spring 21 forces the body upwardly as indicated by the arrow in FIG. 12 thereby retracting the driver shaft 17 to the start position shown in FIG. 4. The coil spring (not shown) about pin 30, which biases the spring loaded actuating wheel 25 to the right as drawn, also rotates the arm lower 31 clockwise thereby advancing the strip 1 from the position shown in FIG. 12 to that of FIG. 4. Thereafter the operation may be repeated to drive the next screw 2 in the strip 1 seriatim.

The detailed operation of the apparatus follows. In the use of the mechanism shown in FIG. 3, the base 20 is positioned on the workpiece and the forwardmost screw 2 is aligned in the starting position in which it is to be inserted in the workpiece. Against the biasing force of the return spring 21, the operator grips the portable screw driver 13 and downwardly forces the shaft 17 into engagement with the forwardmost screw 2 and preferrably extend about the head 4 and washer 3 between about 180° to 120°, more preferrably about 180° to guide and locate the screw head and the washer and thereby coaxially locate the screw with the bit.

The upper housing part of the body 22 moves relative to the lower slide portion 23 on sliding tracks 24. An actuating wheel 25 fixed to the lower portion 23 comes into engagement with an actuating ramp 26. The actuating wheel 25, by means of a linkage mechanism, operates the means to advance and retract the screw strip 1 as explained in detail below.

Figure 4:
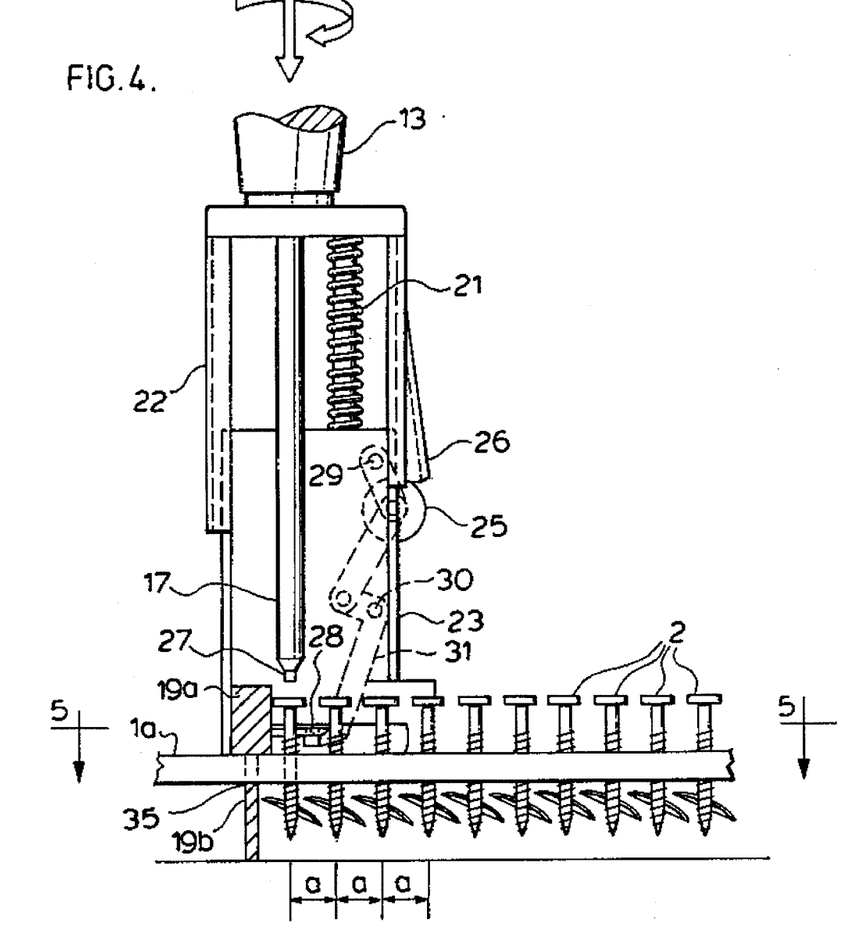
FIGS. 4, 6, 8, 10 and 12 show sectional elevation views, along line 4—4 of FIG. 3, illustrating a step by step method of using the screw driving mechanism in accordance with the method of the present invention, the mechanism of the embodiment illustrated is a modified version of that described in the prior art U.S. Pat. No. 4,146,071 to Meuller et al.
Figure 5:
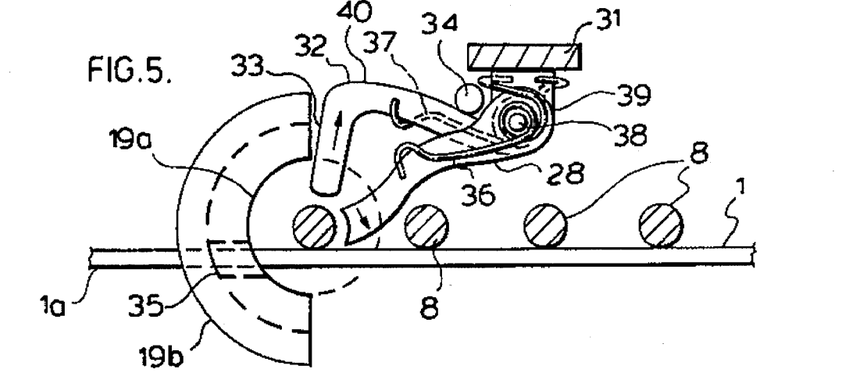
FIGS. 5, 7, 9, and 11 show detail sectional views directed to the operation of the indexing and retracting lever arm mechanisms along lines 5—5, 7—7, 9—9, and 11—11 of FIGS. 4, 6, 8, and 10 respectively.

The initial starting position of the screw driving apparatus is shown in FIGS. 4 and 5. It will be understood that, depending upon the type of fastener used, a pilot hole, through bore, or threaded bore may be first necessarily formed in the workpiece to receive the fastener as is conventional.

The head 4 of the forwardmost screw 2 of the strip 1 is aligned to engage a screw driving bit 27. In the embodiment shown, an abutment block 19 with upper and lower portions 19a and 19b of different radii are used as an abutment against which the head 4 of the forwardmost screw 2 and the washer 3 of that screw 2 are abutted. The abutment block portions 19a and 19b have abutment surfaces which respectively mate the profile of the head 4 and washer 3 of the forwardmost screw 2.

As shown in FIGS. 4 and 5, the upper portion 19a of the abutment block has a semicircular shape sized to receive the head 4 of each screw 2. The upper portion 19a has a diameter slightly larger than the head 4 diameter whereas the lower block portion 19b has a diameter slightly larger than the diameter of the washer 3. The combined guiding effect of: (1) the head 4 engaging and sliding on the upper portion 19a; (2) the washer 3 engaging and sliding on the lower portion 19b; (3) the threaded engagement of the screw shank 8 in the sleeve 5 of the plastic holding strip 1; (4) the tip 7 of the screw 2 piercing the material; and (5) the secure engagement of the bit 27 with the screw head 4, serves to ensure that the screw 2 is accurately positioned and driven into the material surface.

The used portion 1a of the strip 1 which has had the screws 2 removed (as drawn to the left in FIGS. 3–11) extends through a slot 35 in the abutment 19. The used portion 1a therefore will not interfere with the operation of the apparatus and can be broken or cut off and disposed of.

The screw driver shaft 17 includes, in the embodiment shown, a Robertson screw driving bit 27 for engaging and driving in succession the forwardmost screw 2 into the workpiece. It will be understood that any type of bit, including a socket driver, may be used to equal advantage.

An indexing pawl 28 engages the shank 8 of the forwardmost screw 2 and together with the spring loaded linkage (shown in dashed outline) serves as an indexing means to incrementally forwardly advance and align the screws 2 of the strip in succession against the abutment blocks 19a and 19b.

The linkage mechanism illustrated in FIG. 4 is substantially the same as described in the prior art U.S. Pat. No. 4,146,071 to Meuller et al, with the exception of the spring loaded pawl 28 and arm 32 at the lower end thereof which serve as screw indexing and retracting means. The linkage pivots about pins 29 and 30 fixed to side portion 23. The actuating wheel 25 is spring loaded to be biased towards the position shown in FIG. 4.

The downward motion of the upper body portion 22 relative to the slide portion 23 brings the first actuating ramp 26 into engagement with the spring loaded actuating wheel 25 which is biased toward the right as drawn. The movement of the wheel 25 to the left as drawn, thereby actuates the linkage to rotate the lower arm 31 counterclockwise about the lower fixed pin 30.

At the bottom end of the lower arm 31, as shown in FIG. 5, are an indexing pawl 28 and a retracting arm 32. The pawl 28 and retracting arm 32 both pivot about a pin 38 located on a boss 39 at the bottom portion of lower arm 31. The indexing pawl 28 is biased in a counterclockwise direction as drawn to an engaged position to engage the shank of the screws 2. A coil spring 36 engages the pawl 28, the boss 39 and encircles the pin 38 to bias the pawl counterclockwise. When the lower arm 31 rotates counterclockwise about the lower pin 30, the bottom portion of the arm 31 retracts or moves to the right as illustrated in FIG. 5. The pawl 28 is spring loaded to an engaged position, however, it retracts and rotates clockwise as it is dragged rearwardly (to the right as drawn) over the rearwardly adjacent screw 2.

Figure 11:
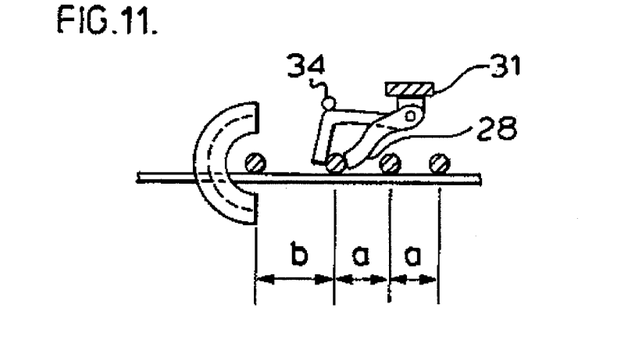

The retracting arm 32 is also biased with a coil spring 37 but in a clockwise direction as drawn. The retracting arm 32 is spring loaded to the retracted position shown in FIG. 5 and is also mounted to boss 29 on the lower arm 31. The retracting arm 32 includes a finger 33 for engaging the shank 8 of the rearwardly adjacent screw 2 in order to retract rearwardly during the screw driving operation. A fixed pin 34 is connected to the slide 23 and remains stationary as the lower arm 31 moves to the right in the progression shown in FIGS. 5, 7, 9, and 11. An associated cam surface 40 of the retracting arm 32 operates together with the fixed pin 34 to guide the positioning of the finger 33 between the retracted position (FIGS. 5 and 7) and the engaged position (FIGS. 9 and 11).

Figure 7:
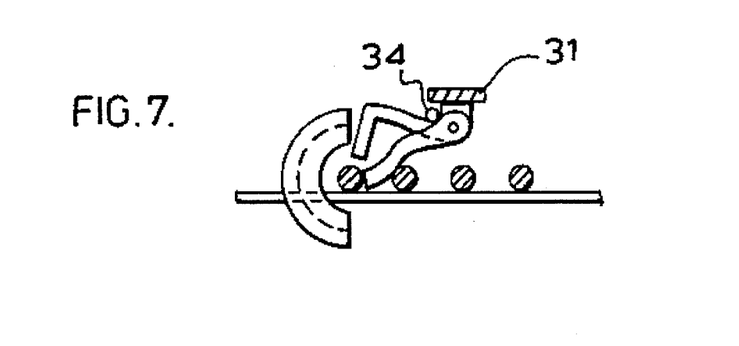

As shown in FIG. 6 and 7, the next step in the screw driving proceedure is to engage the bit 27 and screw 4. Rotating the bit 27 downwardly drives the tip 7 and lower portion of the screw shank 8 into the workpiece. In downwardly driving of the screw 2 the relatively wide shoulder and head 4 of the screw 2 come into engagement with the sleeve 5 and force the bands 10 of the strip 1 to stretch. As the head 4 of the screw passes through the sleeve 5 the bands 10 are ruptured. As a result the forwardmost screw 2 is disengaged from and separates from the remaining strip 1.

Figure 8:
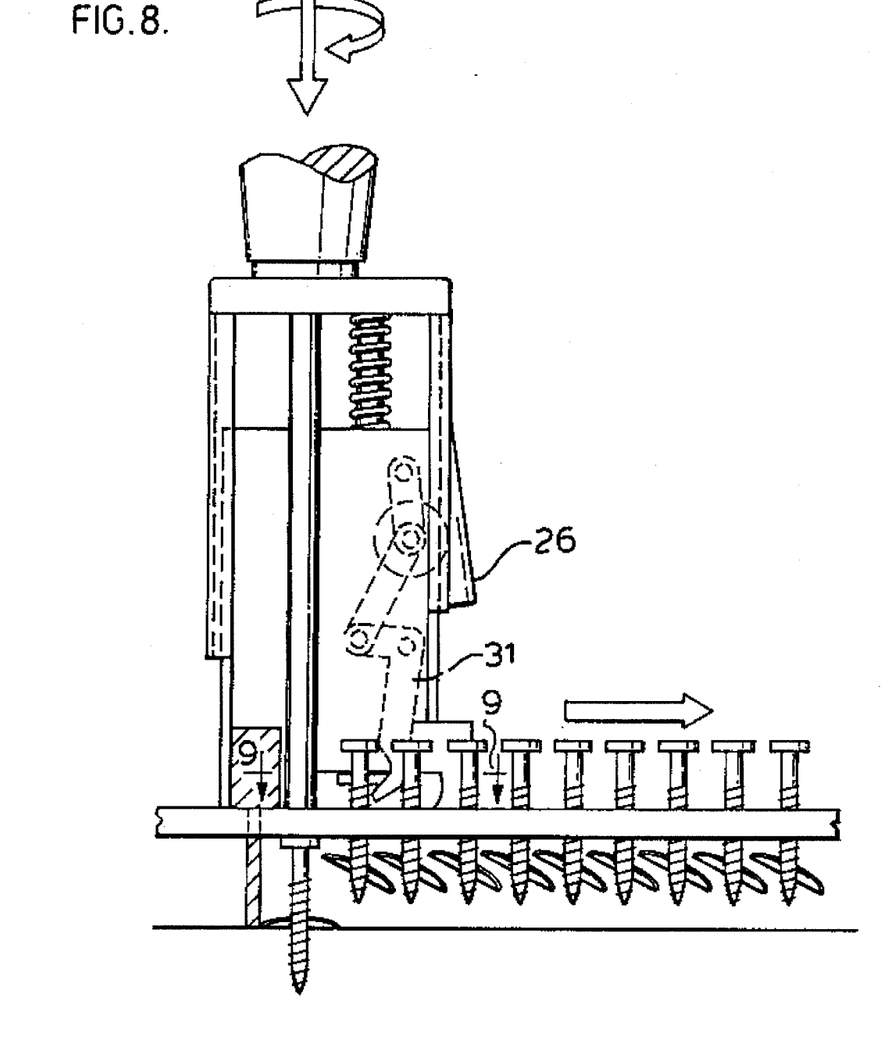
Figure 9:
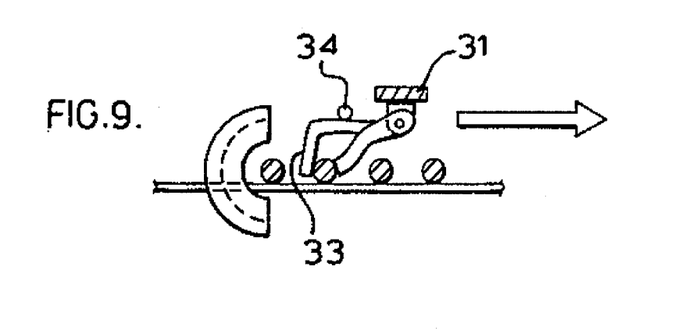

As shown in FIGS. 8 and 9, the finger 33 of the retracting arm 32 serves to retract the strip 1 and screws 2 retained thereon during the driving of the forwardmost screw 2 after disengagement of the forwardmost screw 2 from the strip 1. The finger 33 engages the rearwardly adjacent screw 2 and rearwardly retracts the strip 1 to a separation distance dimension "b" sufficient to enable passage of the bit 27, forwardmost screw 2, and washer 3 thereof without engaging the rearwardly adjacent screw 2 and washer 3 retained in the strip. As will be apparent to one skilled in the art, the timing of the retraction of the strip 1 and the downward motion of the bit 27 must be coordinated to avoid contact between the rearwardly adjacent screw 2 and the bit 27 and forwardmost screw 2. The relative dimensions of the actuating wheel 25, ramp 26, linkage elements, spacing dimension "a", washer 3 diameter, bit size, etc will all effect the timing of the operation.

Progressing from the position shown in FIG. 6 to that of FIG. 8, the actuating wheel 25 rides up the actuating ramp 26 in order to retract the lower arm 31 to the intermediate position shown at which retraction of the rearward screws 2 commence. In FIG. 8 all screws 2 remain spaced apart by dimension "a". As illustrated in FIG. 10, to further retract the lower arm 31 to fully retract the screw strip the actuating wheel 25 rides further up the ramp 26. In FIG. 10, the spacing between the forwardmost screw 2 and the rearwardly adjacent screw 2 has increased to dimension "b" as a result of the finger 33 having engaged and retracted the rearwardly adjacent screw 2 so as to draw it together with the remainder of the screw strip to the right as shown.

The forwardmost screw 2 and washer 3 may then be fully driven to a pre-determined depth in the workpiece as shown in FIG. 10. Since the screw strip has been fully retracted, interference between the remaining portions of the screw strip, the screw 2 and bit 27 does not occur.

As shown in FIG. 11, the spacing between the screw 2 being driven and the rearwardly adjacent screw 2 is an increased dimension indicated as dimension "b".

Figure 13:
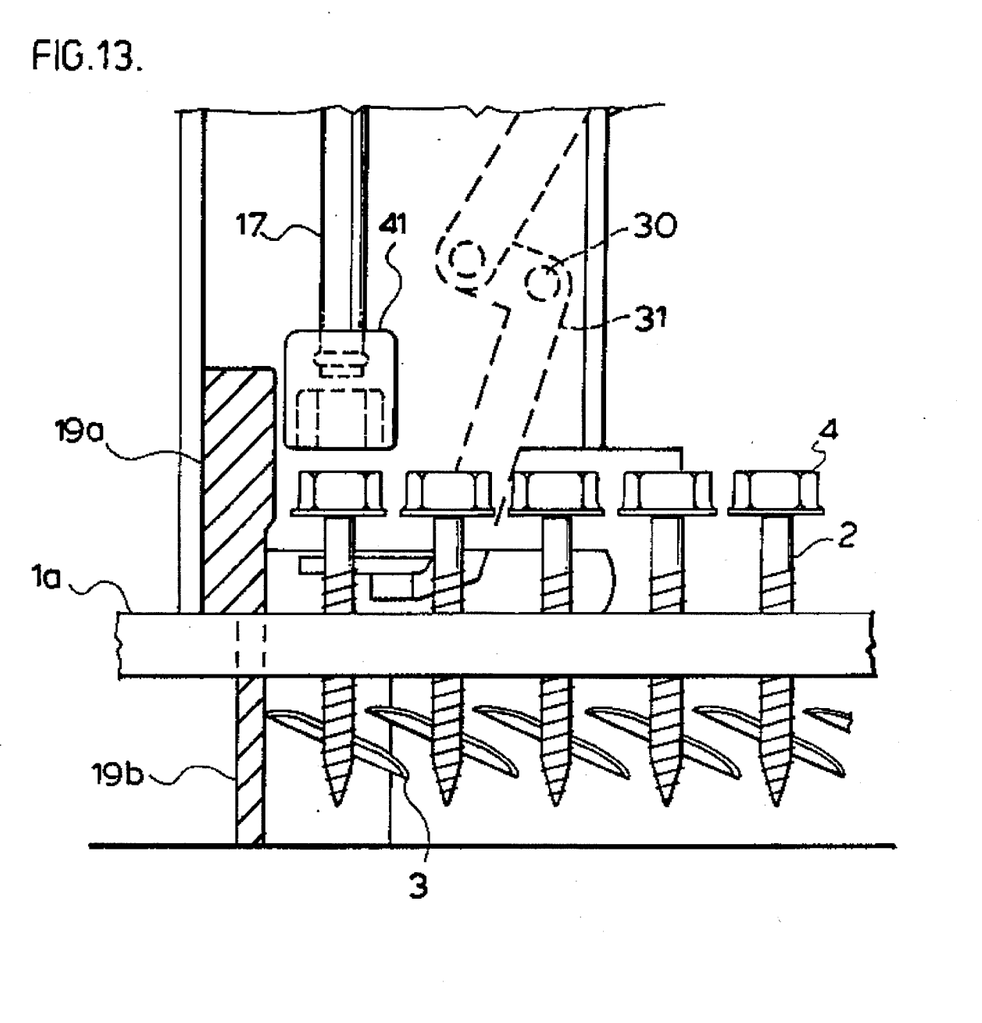
FIG. 13 shows a detail view of an alternative socket driver bit and associated hexagonal headed screws in a position analogous to FIG. 4.

It will be appreciated that dimension "b" is greater than dimension "a" in order to allow clear passage of the screw head 4 and operation of the screw driving bit 27. This feature of the invention is particularly important when socket head screw driving bits 27 are used as shown in FIG. 13 and described in more detail below. In such an application, the socket head extends well beyond the periphery of the screw head 4 and increased clearance is required.

Figure 12:
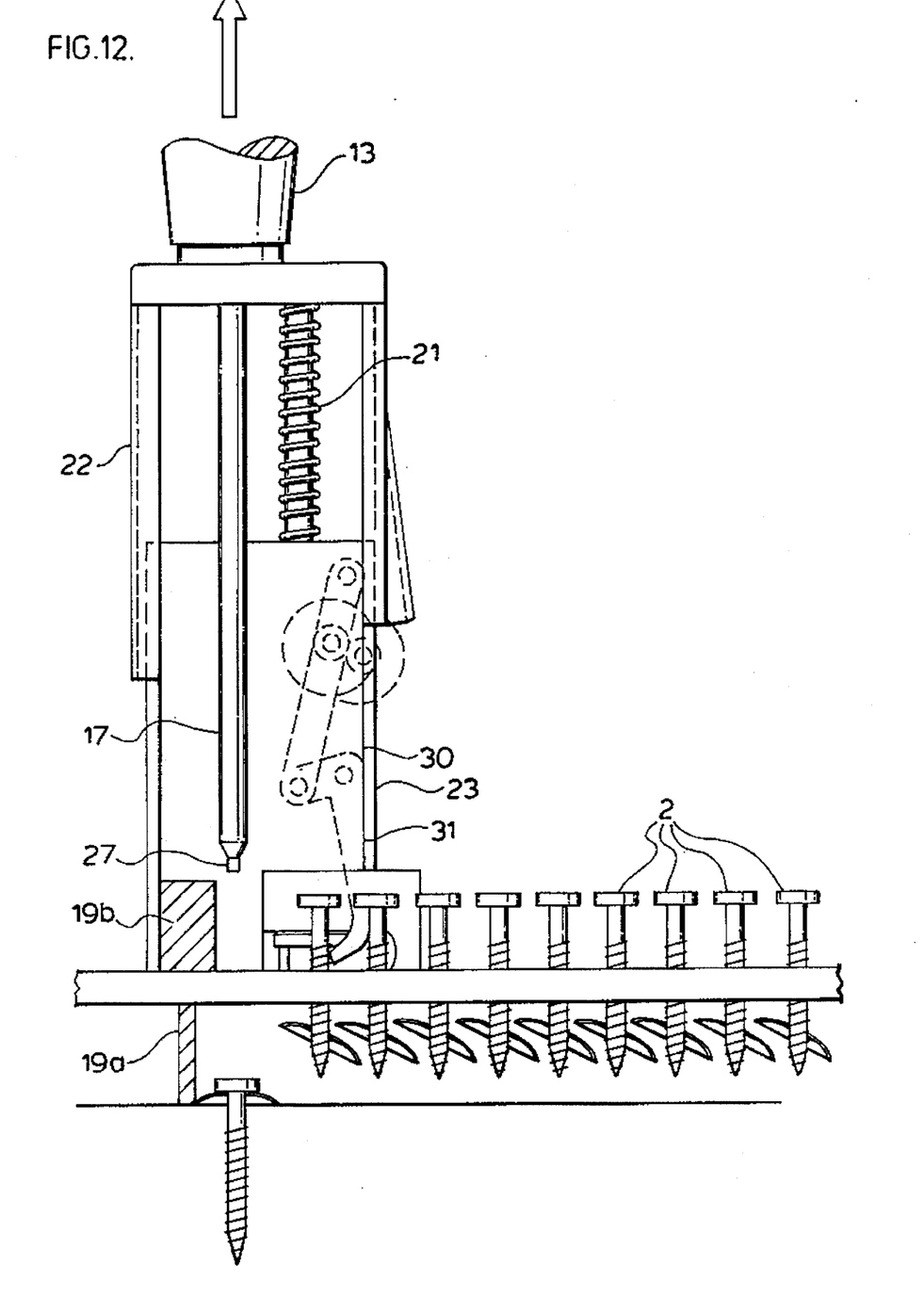

The bit 27 thereafter is retracted and disengaged from the screw head 4 as shown in FIG. 12 generally by relaxing pressure on the drill handle and allowing the action of the return spring 21 the return the apparatus to the position shown in FIG. 4. The proceedure may be repeated to incrementally drive successive screws 2 of the strip. The indexing pawl 28 pushes the rearwardly adjacent screw 2 towards the abutment portions 19a and 19b under the action of the spring loaded actuating wheel 25 moving from the position shown in FIG. 10 to the position shown in FIG. 4.

Therefore the linkage mechanism and actuating wheel 25 serve as actuating means for reciprocally forwardly and rearwardly actuating the spring loaded pawl 28.

FIG. 13 shows an alternative embodiment wherein the screws 2 to be driven have a hexagonal heads 4. The elongate driver shaft 17 therefore is fitted with a socket driving bit 41. The abutment block 19 is modified to guide the outer suface of the socket driver 41 with the upper block portion 19a, whereas the lower block portion 19b guides the washer 3. All other features of the invention operate as described above.

It will be apparent that various other means may be used to advance and retract the screw strip in accordance with the present invention. The mechanism illustrated in FIGS. 4 through 13 represents a preferred embodiment known to the applicant representing a modification of the prior art to include the spring loaded pawl 28, retracting arm 32 and the secondary actuating ramp 35.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

What I claim is:

1. A holding strip for holding a plurality of threaded fasteners each carrying a washer in a row, the strip comprising:

uniformly spaced parallel sleeves interconnected by lands with one of the fasteners coaxially received in each sleeve, the strip having a forward end and a rearward end, each fastener having a head at an upper end, a tip at a lower end and a threaded shank extending from below the head to the tip, each fastener received in each sleeve with each fastener head extending from an upper end of the sleeve and each fastener tip extending from a lower other end of the sleeve, a circular washer with a central opening therethrough engaged about the shank of each fastener between the sleeve receiving that fastener and the tip of that fastener the diameter of each washer at any points about an outermost periphery of the washer being greater than the distance between axial centers of adjacent of the sleeves, wherein with the exception of the forwardmost washer of the strip, each washer overlaps with a forwardly adjacent washer, each washer disposed at an acute angle to a longitudinal axis of the fastener shank such that each washer is spaced from the shanks of adjacent fasteners, the sleeve threadably engaging the threaded shank, the sleeve having a reduced strength portion between the lands such that a fastener, on being threaded tip first into a workpiece, is automatically separated from its sleeve carrying the washer while simultaneously maintaining the length of the strip substantially intact and while guiding the fastener by threaded engagement of the fastener in its respective sleeve.

2. A strip as claimed in claim 1 wherein a forward portion of each washer is disposed above a rearward portion of said forwardly adjacent washer.

3. A strip as claimed in claim 1 wherein the washer is frictionally engaged on the threaded shank of the fastener.

4. A strip as claimed in claim 1 wherein the sleeves extend along a portion of the threaded shank in an axial direction thereof and comprise inwardly facing threads for receiving the threaded shank.

5. A strip as claimed in claim 4 wherein the sleeves only partially surround said fasteners to form said reduced strength portion.

6. A strip as claimed in claim 1 wherein the sleeves completely surround the threaded shank of each fastener and are formed with longitudinal aligned perforations along one side thereof, substantially between the lands, defining said reduced strength portion.

7. A strip according to claim 6 wherein the perforations are formed by strap-like wall portions of each sleeve.

8. A strip according to claim 1 wherein the sleeves are made of plastic.

9. A strip according to claim 1 wherein the threaded fasteners are selected from the group consisting of screws and bolts.

10. A method of driving threaded fasteners collated together in a strip uniformly spaced in parallel relation from each other, the strip having: a forward end; a rearward end; and spaced parallel sleeves interconnected by lands with one of the fasteners received in each sleeve, each fastener having: a head at an upper end; a tip at a lower end; a threaded shank extending below the head to the tip; and a washer engaged about the shank of each fastener between the sleeve receiving that fastener and the fastener's tip, with the exception of a forwardmost washer of the strip, each washer overlapping with a forwardly adjacent washer, the sleeve threadably engaging the threaded shank, the sleeve having a reduced strength portion between the lands wherein a fastener on being threaded tip first into a workpiece is automatically separated from its sleeve carrying the washer while simultaneously maintaining the length of the strip substantially intact and while guiding the fastener by threaded engagement of the fastener in its respective sleeve, said method comprising the steps of:

aligning the head of a forwardmost fastener of the strip to engage a fastener driving bit of said mechanism;

engaging said bit and fastener head;

downwardly driving the fastener such that the tip and lower portion of the shank are driven into the workpiece by rotating the bit, thereby separating the forwardmost fastener from the strip;

rearwardly retracting the strip, and remaining fasteners retained therein, a distance sufficient to enable the passage of the bit, forwardmost fastener and washer thereon without engaging a rearwardly adjacent fastener and washer thereon retained in said strip;

driving the forwardmost fastener and washer to a predetermined depth in the workpiece;

disengaging and retracting the bit; and repeating the procedure to incrementally drive successive fasteners of the strip.

11. A method according to claim 10 wherein the bit is a socket driver.

12. A method according to claim 10 wherein the threaded fasteners are selected from the group consisting of screws and bolts.

13. An apparatus for driving fasteners retained in a holding strip for holding a plurality of fasteners each carrying a washer in a row, the strip comprising: uniformly spaced parallel sleeves interconnected by lands with one of the fasteners received in each sleeve, the strip having a forward end and a rearward end, each fastener having a head at an upper end, a tip at a lower end and a threaded shank extending from below the head to the tip, each fastener received in each sleeve with the fastener's head extending from an upper end of the sleeve and the fastener's tip extending from a lower other end of the sleeve, a washer engaged about the shank of each fastener between the sleeve receiving that fastener and the fastener's tip, the diameter of each washer being greater than the distance between axial centers of the sleeve, wherein, with the exception of the forwardmost washer of the strip, each washer overlaps with a forwardly adjacent washer, the sleeve threadably engaging the threaded shank, the sleeve having a reduced strength portion between the lands such that a fastener on being threaded tip first into a workpiece is automatically separated from its sleeve carrying the washer while simultaneously maintaining the length of the strip substantially intact and while guiding the fastener by threaded engagement of the fastener in its respective sleeve, the apparatus comprising:
- a body having a lateral slot and an intersecting vertical bore, the slot adapted to slidingly receive said strip;
- an elongate driver shaft journalled and longitudinally slidably housed in said bore, said shaft including fastener driving bit means for engaging and driving said forwardmost fastener in succession into said workpiece;
- indexing means for incrementally forwardly advancing and aligning the fasteners of said strip in succession coaxially with said bore; and
- retracting means for retracting the strip and fasteners retained thereon during the driving of the forwardmost fastener after disengagement of the forwardmost fastener from the strip.

14. An apparatus according to claim 13 wherein the indexing means comprise:

pawl means for engagement with the shank of the forwardmost and rearwardly adjacent fasteners; and actuating means for reciprocally forwardly and rearwardly actuating said pawl means.

15. An apparatus according to claim 14 wherein the retracting means comprise a spring loaded arm means, mounted to said actuating means, for engagement with the shank of said rearwardly adjacent fastener.

16. An apparatus according to claim 13 including abutment means for engaging and aligning the forwardmost fastener, the abutment means comprising a block having an abutment surface mating the profile of the head of said forwardmost fastener.

17. An apparatus according to claim 13 including abutment means for engaging and aligning the forwardmost fastener, the abutment means comprising a block having an abutment surface mating the profile of the washer of said forwardmost fastener.

18. An apparatus according to claim 13 wherein the threaded fasteners are selected from the group consisting of screws and bolts.

* * * * *